(12) United States Patent
Burnham

(10) Patent No.: US 8,597,394 B2
(45) Date of Patent: *Dec. 3, 2013

(54) ORGANIC CONTAINING SLUDGE TO FERTILIZER ALKALINE CONVERSION PROCESS

(75) Inventor: Jeffrey C. Burnham, Beech Island, SC (US)

(73) Assignee: VitAg Corporation, Beech Island, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,843

(22) Filed: May 16, 2012

(65) Prior Publication Data
US 2012/0222462 A1 Sep. 6, 2012

Related U.S. Application Data

(63) Continuation of application No. 13/103,637, filed on May 9, 2011, now Pat. No. 8,202,342, which is a continuation of application No. 12/705,813, filed on Feb. 15, 2010, now Pat. No. 7,947,105, which is a continuation of application No. 11/521,604, filed on Sep. 15, 2006, now Pat. No. 7,662,206.

(60) Provisional application No. 60/716,964, filed on Sep. 15, 2005.

(51) Int. Cl.
C05F 3/00 (2006.01)
C05F 7/00 (2006.01)
C05F 9/00 (2006.01)
C05F 11/00 (2006.01)

(52) U.S. Cl.
USPC ............ 71/11; 71/12; 71/13; 71/14; 71/15; 71/17; 71/21; 71/22; 71/25

(58) Field of Classification Search
USPC ............ 71/11, 12, 13, 14, 15, 17, 21, 22, 25, 71/64.03, 64.13
See application file for complete search history.

(56) References Cited

U.S. PATENT DOCUMENTS

| 2,026,969 | A | 1/1936 | Flynn |
| 2,568,901 | A | 9/1951 | Stengel |

(Continued)

FOREIGN PATENT DOCUMENTS

| DE | 2523628 | 12/1976 |
| DE | 2800915 | 9/1978 |

(Continued)

OTHER PUBLICATIONS

U.S. Appl. No. 08/520,959, Burnham; Jeffrey C.

(Continued)

Primary Examiner — Wayne Langel
(74) Attorney, Agent, or Firm — Remenick PLLC

(57) ABSTRACT

This invention is directed to systems, devices and methods for treating organic-containing sludges and converting such sludges to high value fertilizers containing both inorganic and organic fertilizer components, which creates an inorganically-augmented bioorganic fertilizer. The invention describes methods to create a thixotrophic or paste-like material via the application of mixing energy to the organic sludge followed by an alkaline treatment and a subsequent ammoniation. The invention further describes a method to increase the plant nutrient content in the organic containing product to a level which permits the finished granular fertilizer product to compete in the commercial agricultural fertilizer marketplace. Further, the invention reduces odors associated with said organic-containing sludges.

21 Claims, 2 Drawing Sheets

Diagram 2

The Alkaline Ammonia Pulse (AAP) Process

(56) References Cited

U.S. PATENT DOCUMENTS

| | | |
|---|---|---|
| 2,755,176 A | 7/1956 | Pearce et al. |
| 2,800,457 A | 7/1957 | Green et al. |
| 2,800,458 A | 7/1957 | Green |
| 2,902,342 A | 9/1959 | Rehfeld |
| 3,050,383 A | 8/1962 | Paden et al. |
| 3,259,482 A | 7/1966 | Hansen |
| 3,264,088 A | 8/1966 | Hansen |
| 3,264,089 A | 8/1966 | Hansen |
| 3,304,588 A | 2/1967 | McIlvaine |
| 3,345,288 A | 10/1967 | Sontheimer |
| 3,475,154 A | 10/1969 | Kato |
| 3,476,683 A | 11/1969 | Liljeren |
| 3,655,395 A | 4/1972 | Karnemaat |
| 3,756,784 A | 9/1973 | Pittwood |
| 3,796,669 A | 3/1974 | Kiritani et al. |
| 3,837,872 A | 9/1974 | Conner |
| 3,915,853 A | 10/1975 | Luck |
| 3,939,280 A | 2/1976 | Karnemaat |
| 3,942,970 A | 3/1976 | O'Donnell |
| 3,960,718 A | 6/1976 | Lebo |
| 3,966,450 A | 6/1976 | O'Neill et al. |
| 4,001,140 A | 1/1977 | Foris et al. |
| 4,076,515 A | 2/1978 | Rickard |
| 4,079,003 A | 3/1978 | Manchak |
| 4,100,103 A | 7/1978 | Foris et al. |
| 4,108,771 A | 8/1978 | Weiss |
| 4,124,405 A | 11/1978 | Quienot |
| 4,134,750 A | 1/1979 | Norton et al. |
| 4,154,593 A | 5/1979 | Brown et al. |
| 4,180,459 A | 12/1979 | Zievers |
| 4,219,347 A | 8/1980 | Young |
| 4,230,568 A | 10/1980 | Chappell |
| 4,249,929 A | 2/1981 | Kneer |
| 4,270,279 A | 6/1981 | Roediger |
| 4,304,588 A | 12/1981 | Moore, Jr. |
| 4,306,978 A | 12/1981 | Wurtz |
| 4,377,406 A | 3/1983 | Achorn et al. |
| 4,377,486 A | 3/1983 | Barrick et al. |
| 4,405,354 A | 9/1983 | Thomas, II et al. |
| 4,454,259 A | 6/1984 | Reischl et al. |
| 4,500,428 A | 2/1985 | Lynch et al. |
| 4,514,307 A | 4/1985 | Chestnut et al. |
| 4,519,831 A | 5/1985 | Moore |
| 4,541,986 A | 9/1985 | Schwab et al. |
| 4,554,002 A | 11/1985 | Nicholson |
| 4,601,863 A | 7/1986 | Shioi et al. |
| 4,619,684 A | 10/1986 | Salladay et al. |
| 4,655,932 A | 4/1987 | Roslonski |
| 4,659,472 A | 4/1987 | Nordlund et al. |
| 4,711,659 A | 12/1987 | Moore |
| 4,743,287 A | 5/1988 | Robinson |
| 4,772,490 A | 9/1988 | Kogler et al. |
| 4,781,842 A | 11/1988 | Nicholson |
| 4,792,349 A | 12/1988 | Trimm et al. |
| 4,793,927 A | 12/1988 | Meehan et al. |
| 4,902,431 A | 2/1990 | Nicholson et al. |
| 4,966,706 A | 10/1990 | Gregor |
| 4,997,572 A | 3/1991 | Wurtz |
| 5,013,458 A | 5/1991 | Christy, Sr. et al. |
| 5,051,031 A | 9/1991 | Schumacher et al. |
| 5,087,375 A | 2/1992 | Weinwurm |
| 5,118,337 A | 6/1992 | Bleeker |
| 5,125,951 A | 6/1992 | Lahoda et al. |
| 5,135,664 A | 8/1992 | Burnham |
| 5,147,563 A | 9/1992 | Long, Jr. et al. |
| 5,183,577 A | 2/1993 | Lehmann |
| 5,238,480 A | 8/1993 | Rehberg et al. |
| 5,252,116 A | 10/1993 | Markham et al. |
| 5,259,977 A | 11/1993 | Girovich et al. |
| 5,275,733 A | 1/1994 | Burnham |
| 5,340,376 A | 8/1994 | Cunningham |
| 5,342,442 A | 8/1994 | Nechvatal et al. |
| 5,346,527 A | 9/1994 | Rehbein et al. |
| 5,356,540 A | 10/1994 | Khan et al. |
| 5,385,673 A | 1/1995 | Fergen |
| 5,393,317 A | 2/1995 | Robinson |
| 5,401,402 A | 3/1995 | Christy et al. |
| 5,409,605 A | 4/1995 | Haley et al. |
| 5,417,861 A | 5/1995 | Burnham |
| 5,419,839 A | 5/1995 | Haley et al. |
| 5,422,015 A | 6/1995 | Angell et al. |
| 5,435,923 A | 7/1995 | Girovich |
| 5,443,613 A | 8/1995 | Robinson |
| 5,466,273 A | 11/1995 | Connell |
| 5,500,044 A | 3/1996 | Meade et al. |
| 5,554,279 A | 9/1996 | Christy |
| 5,556,445 A | 9/1996 | Quinn et al. |
| 5,580,458 A | 12/1996 | Yamasaki et al. |
| 5,593,590 A | 1/1997 | Steyskal |
| 5,593,591 A | 1/1997 | Ohsol et al. |
| 5,603,842 A | 2/1997 | Whitaker et al. |
| 5,618,442 A | 4/1997 | Christy |
| 5,635,069 A | 6/1997 | Boss et al. |
| 5,669,969 A | 9/1997 | Meade et al. |
| 5,679,129 A | 10/1997 | Hon |
| 5,681,481 A | 10/1997 | Christy et al. |
| 5,733,355 A | 3/1998 | Hibino et al. |
| 5,766,302 A | 6/1998 | Lefroy et al. |
| 5,783,073 A | 7/1998 | Christy et al. |
| 5,807,724 A | 9/1998 | Resnick |
| 5,849,060 A | 12/1998 | Diping et al. |
| 5,853,450 A | 12/1998 | Burnham et al. |
| 5,853,590 A | 12/1998 | Burnham |
| 5,862,610 A | 1/1999 | Lipert |
| 5,876,613 A | 3/1999 | Bonnin et al. |
| 5,906,750 A | 5/1999 | Haase |
| 5,916,448 A | 6/1999 | Fergen |
| 5,984,992 A | 11/1999 | Greer et al. |
| 5,993,505 A | 11/1999 | Tijsma et al. |
| 6,051,411 A | 4/2000 | Turtakovsky et al. |
| 6,103,191 A | 8/2000 | Luker |
| 6,117,406 A | 9/2000 | Vogel et al. |
| 6,159,263 A | 12/2000 | Greer et al. |
| 6,165,550 A | 12/2000 | Markusch et al. |
| 6,176,891 B1 | 1/2001 | Komoriya et al. |
| 6,187,074 B1 | 2/2001 | von Locquenghien et al. |
| 6,237,246 B1 | 5/2001 | Millard |
| 6,237,264 B1 | 5/2001 | Gulick, Jr. |
| 6,256,902 B1 | 7/2001 | Flaherty et al. |
| 6,284,278 B1 | 9/2001 | Waldman et al. |
| 6,325,035 B1 | 12/2001 | Codina et al. |
| 6,331,300 B1 | 12/2001 | Dybas et al. |
| 6,398,840 B1 | 6/2002 | Orta-Castro et al. |
| 6,406,510 B1 | 6/2002 | Burnham |
| 6,409,788 B1 | 6/2002 | Sower |
| 6,409,789 B1 | 6/2002 | Gilbert |
| 6,461,399 B1 | 10/2002 | Connell |
| 6,465,706 B1 | 10/2002 | Rogers et al. |
| 6,517,599 B2 | 2/2003 | Gilbert |
| RE38,238 E | 8/2003 | Nicholson et al. |
| 6,623,650 B2 | 9/2003 | Millard |
| 6,666,154 B2 | 12/2003 | Logan et al. |
| 6,716,360 B2 | 4/2004 | Titmas |
| 6,752,848 B2 | 6/2004 | Logan et al. |
| 6,752,849 B2 | 6/2004 | Logan et al. |
| 6,758,879 B2 | 7/2004 | Greer et al. |
| 6,841,515 B2 | 1/2005 | Burnham |
| 6,852,142 B2 | 2/2005 | Varshovi |
| 7,128,880 B2 | 10/2006 | Dahms et al. |
| 7,497,956 B2 | 3/2009 | Blais et al. |
| 7,513,927 B2 | 4/2009 | Faulmann et al. |
| 7,604,742 B2 | 10/2009 | Shankar et al. |
| 7,662,205 B2 | 2/2010 | Burnham |
| 7,662,206 B2 | 2/2010 | Burnham |
| 7,789,931 B2 | 9/2010 | Burnham et al. |
| 7,947,104 B2 | 5/2011 | Burnham et al. |
| 7,947,105 B2 | 5/2011 | Burnham |
| 8,057,569 B2 | 11/2011 | Burnham et al. |
| 8,105,413 B2 | 1/2012 | Burnham |
| 2002/0098982 A1 | 7/2002 | Burnham |
| 2002/0157439 A1 | 10/2002 | Gilbert |
| 2003/0070460 A1 | 4/2003 | Logan et al. |
| 2003/0089151 A1 | 5/2003 | Logan |
| 2003/0121302 A1 | 7/2003 | Oliver et al. |

(56) References Cited

U.S. PATENT DOCUMENTS

| | | |
|---|---|---|
| 2003/0136165 A1 | 7/2003 | Logan et al. |
| 2004/0065127 A1 | 4/2004 | Connell |
| 2004/0177664 A1 | 9/2004 | Hale |
| 2004/0258305 A1 | 12/2004 | Burnham et al. |
| 2005/0005660 A1 | 1/2005 | Burnham et al. |
| 2005/0019207 A1 | 1/2005 | Oliver et al. |
| 2005/0039508 A1 | 2/2005 | Burnham |
| 2006/0243009 A1 | 11/2006 | Burnham |
| 2007/0257715 A1 | 11/2007 | Semerdzhiev |
| 2008/0000279 A1 | 1/2008 | Faulmann et al. |
| 2008/0034822 A1 | 2/2008 | Burnham et al. |
| 2008/0230484 A1 | 9/2008 | Burnham et al. |
| 2010/0139345 A1 | 6/2010 | Burnham |
| 2010/0139346 A1 | 6/2010 | Burnham |
| 2010/0288003 A1 | 11/2010 | Burnham et al. |

FOREIGN PATENT DOCUMENTS

| | | |
|---|---|---|
| DE | 4127459 | 2/1993 |
| EP | 0143392 | 6/1985 |
| EP | 0557078 | 8/1993 |
| EP | 0770586 | 5/1997 |
| FR | 2133115 | 11/1972 |
| FR | 2757504 | 6/1998 |
| JP | 58032638 | 2/1983 |
| JP | 9110570 | 4/1997 |
| JP | 2001129597 | 5/2001 |
| JP | 2002248454 | 3/2002 |
| WO | WO9856735 | 12/1998 |
| WO | WO9947282 | 9/1999 |
| WO | WO0136082 | 5/2001 |
| WO | WO0136887 | 5/2001 |
| WO | WO0168562 | 9/2001 |
| WO | WO0169150 | 9/2001 |

OTHER PUBLICATIONS

U.S. Appl. No. 08/532,273, Burnham; Jeffrey C.
U.S. Appl. No. 10/854,677, filed Feb. 24, 2005, Burnham.
U.S. Appl. No. 13/472,828, Burnham.
U.S. Appl. No. 13/104,127, filed Nov. 3, 2011, Burnham.
U.S. Appl. No. 12/981,933, filed Jun. 30, 2011, Burnham.
U.S. Appl. No. 13/349,967, Burnham.
U.S. Appl. No. 60/654,957, Burnham
U.S. Appl. No. 60/659,434, Burnham.
U.S. Appl. No. 60/700,730, Burnham.
U.S. Appl. No. 60/704,458, Burnham.
PCT Search Report PCT/US06/006220.
PCT Search Report PCT/US06/008536.
PCT Search Report PCT/US06/036085.
PCT Search Report PCT/US08/054315.
PCT Search Report PCT/US10/062504.
PCT Written Opinion PCT/US06/006220.
PCT Written Opinion PCT/US06/008536.
PCT Written Opinion PCT/US06/036085.
PCT Written Opinion PCT/US08/054315.
AU Exam Report for PCT/US06/036085, dated Jan. 20, 2011.
CA Exam Report for PCT/US06/08536, dated Dec. 9, 2011.
CA Exam Report for PCT/US06/08536, dated Mar. 28, 2011.
RU Examination Report for PCTUS08054315.
AU Exam Report for PCTUS08054315, dated Jul. 5, 2010.
JP Exam Report for PCTUS08054315, dated Dec. 21, 2010.
CN Exam Report for PCTUS08054315.
AU Exam Report for PCTUS08054315, dated Nov. 23, 2010.
CA Exam Report for PCTUS08054315, dated May 10, 2011.
CA Exam Report for PCT/US2008/54315, dated Feb. 9, 2012.

Diagram 1

ORGANIC CONTAINING SLUDGE TO FERTILIZER ALKALINE CONVERSION PROCESS

REFERENCE TO RELATED APPLICATIONS

This application is a continuation of U.S. patent application Ser. No. 13/103,637 entitled "Organic Containing Sludge to Fertilizer Alkaline Conversion Process" filed May 9, 2011, which is a continuation of U.S. patent application Ser. No. 12/705,813 entitled "Organic Fertilizer Made by Alkaline Conversion Process" filed Feb. 15, 2010, and issued as U.S. Pat. No. 7,947,105 May 24, 2011, which is a continuation of U.S. patent application Ser. No. 11/521,604 entitled "Organic Containing Sludge to Fertilizer Alkaline Conversion Process" filed Sep. 15, 2006, and issued as U.S. Pat. No. 7,662,206 on Feb. 16, 2010 and claims priority to U.S. Provisional Application No. 60/716,964, entitled "Organic Sludge to Fertilizer Conversion Process," filed Sep. 15, 2005, the entirety of each of which is specifically incorporated by reference herein.

BACKGROUND

1. Field of the Invention

This invention is directed to fertilizers and methods for treating biosolids such as organic-containing sludges and alkaline materials thereby converting them into useful inorganic-organic nutrient fertilizers. The invention is also directed to treatment of sludges or biosolids to reduce noxious odorants prior to drying steps in manufacture of organic containing fertilizers.

2. Description of the Background

There are a number of methods currently available for converting organic materials into fertilizers. Examples of such organic materials include, animal residuals and manures, sewage sludge, lagoon sludges, pharmaceutical fermentation sludges, food fermentation sludges and other microbial digested organic materials such as blood meal, fish by-products and meal, food wastes, food processing wastes and animal remains such as slaughterhouse wastes (all hereinafter referred to as "biosolids").

When these organic-containing materials are manufactured into fertilizers, very often they contain low levels of the important plant nutrients, nitrogen, phosphorus and potassium. This limits their usefulness and marketability in commercial agriculture which applies value to a fertilizer based upon its nutrient content, especially the nitrogen and phosphorus concentrations in dry weight. This is especially true of products manufactured from municipal biosolids as the nitrogen level in biosolids on a dry weight basis is usually 3 to 5 percent. The implications of a low fertilizer nutrient level are low market value with concomitant limitations on the distance these materials can be transported from their manufacturing site. In contrast, high nitrogen fertilizers (products containing over 8 percent nitrogen by dry weight and especially products over 12 percent nitrogen by dry weight) can be transported thousands of miles to wholesale and retail markets.

A few organic products can be purchased "fortified" for a higher nutrient analysis. The ingredients used to fortify organic fertilizers are generally inorganic fertilizer components which because these already are fertilizers are expense, for example, ammonium nitrate, ammonium sulfate, ammonium phosphate or urea and various sources of potash (potassium) such as potassium oxides and greensand.

Organic fertilizers depend on soil organisms to break them down to release nutrients; therefore, most are effective only when soil is moist and warm enough for the microorganisms to be active. Nutrient release by microbial activity, in general, occurs over a fairly long time period. One potential drawback is that the organic fertilizer may not release enough of their principal nutrient when the plant needs it for growth.

Biosolids or dewatered sewer sludge is a recycled product of municipal sewage treatment plants. Two forms are commonly available: activated and composted. Activated sludge has higher concentrations of nutrients (approximately 5-3-0) than composted sludge. It is usually sold in a dry, granular form for use as a general purpose, long lasting, non-burning fertilizer. Composted sludge is used primarily as a soil amendment or horticulture material and has a lower nutrient content (approximately 1-2-0) because the microbial activity in the composting process has caused the logs of nutrients into the atmosphere.

Compared to synthetic fertilizer formulations, organic fertilizers contain relatively low concentrations of actual nutrients, but they perform important functions which the synthetic formulations do not. They increase the organic content and consequently the water-holding capacity of the soil. They improve the physical structure of the soil which allows more air to get to plant roots. Where organic sources are used for fertilizer, bacterial and fungal activity increases in the soil. Mycorrhizal fungi which make other nutrients more available to plants thrive in soil where the organic matter content is high. Organically derived plant nutrients are slow to leach from the soil making them less likely to contribute to water pollution than synthetic fertilizers.

There is concern with long term effects of using biosolids products in agriculture, particularly around edible crops, in the prior art. Possible negative effects varied with the origin of the biosolids and with the characteristics of the biosolids, for example, the level of disinfection that was applied to the biosolids prior to its usage and to the level of metals that were contained in the biosolids. Many commercial biosolids processing technologies produce what is classed by the United States Environmental Protection Agency as a Class B biosolids. This type of biosolids still has potential pathogens present because of the milder stringency permitted in the processing of these biosolids as compared to the high stringency Class A biosolids. The majority of biosolids processed in the United States in 2006 are still processed using Class B type protocols. A third concern regarding biosolids safety is their potential containment of personal pharmaceuticals or bio-active compounds such as antibiotics. Very few commercial biosolids processing methodologies have the mechanisms to eliminate these types of materials. Thus there is a need for safer organic fertilizers made from organic sludge.

SUMMARY

The present invention overcomes the problems and disadvantages associated with current strategies and designs for the production of fertilizers containing organic components. The invention provides new tools and methods for converting organic containing materials into safe and valuable nutrient fertilizers that are marketable in commercial agriculture.

This invention is directed to systems, devices and methods for treating organic-containing sludges such as, for example, municipal biosolids, manures, animal residuals, pharmaceutical wastes, lagoon sludges, fermentation wastes and combinations thereof. These methods destroys the pathogens contained in such sludges, especially municipal biosolids and manures and in the final product creates a Class A product as defined by the U.S. EPA. The present invention also increases the plant nutrient content, especially nitrogen, phosphorus and/or potassium and iron in such organic-containing sludges. The present invention describes a method which incorporates a significant alkaline treatment and ammonia exposure to create a strong antimicrobial stress on the microorganisms present immediately prior to an acidification of the material which captures or fixes the ammonia present into ammonium salts which are components of plant nutrient fertilizers. The present invention converts dewatered municipal wastewater biosolids or other organic-containing sludges to a fertilizer comprising sufficient organic and inorganic plant nutrients to be valuable and saleable into the commercial agricultural industry and also, secondarily, reduces the odors associated with such organic sludges.

The present invention is also directed to processes for converting municipal biosolids, manures or animal residuals, or other biological and organic-containing sludges into fertilizers. The invention initially creates a thixotrophic or plastic homogenous paste of the biosolids with no water addition. This is followed by a significant alkaline pH increase or pulse to above pH 10.0 coupled with an ammonification of the mix to: a) create a strong antimicrobial stress; b) further improve odors, and; c) simultaneously introduce nitrogen into the mix. This ammonification is followed by an acidification using concentrated phosphoric acid and/or, sulfuric acid to: a) fix the ammonia into ammonium phosphate and or ammonium sulfate; b) create an acid stress on the alkaline and ammonia exposed microbes, and; c) to introduces phosphate and sulfur into the mix to create nutrient value in the finished product. If the organic-containing, sludge is noxiously odorous then an oxidation step can be inserted in which a strong oxidant, preferably, potassium or calcium ferrate, is reacted with the mix to interact with a significant portion of the reduced sulfur compounds, amines and other organic molecules including odorants such that they are partially oxidized and rendered less odorous.

In addition, the present invention is directed to process herein described further including the addition of chemicals to the fertilizer mix such as one or more oxidants such as, for example, hypochlorites such as sodium hypochlorite or calcium hypochlorite, iron oxides, other metal oxides, calcium ferrate, potassium ferrate, or sodium ferrate, oxygen, hydrogen peroxide, other peroxides, ozone and chlorine, dioxide to further reduce odors As further elaborated in U.S. patent application Ser. Nos. 11/359,751 and 11/371,238 (both of which are hereby incorporated by reference) other nutrients can be added with granulation agents to facilitate the creation of extrusions or granules that are hard, dry, between pH 5.6 and pH 7.5 and valuable on the commodity agricultural fertilizer market. This process would compete extremely well against alkaline stabilized biosolids containing processes and their resultant products in that less calcium oxide or calcium hydroxide would need to be used, if at all, and the significant alkaline and disinfecting agent, ammonia, contributes significant nitrogen value to the finished product. The process and resulting products would be considered USEPA Class A biosolids containing products and would commercially compete well against the heat-dried biosolids pellets as manufactured at many municipal wastewater treatment plants ("WWTPs") presently throughout the U.S. and the world as well as of course the traditional alkaline-stabilized biosolids products.

Other embodiments and advantages of the invention are set forth in part in the description, which follows, and in part, may be obvious from this description, or may be learned from the practice of the invention.

DESCRIPTION OF THE INVENTION

Figure 1:
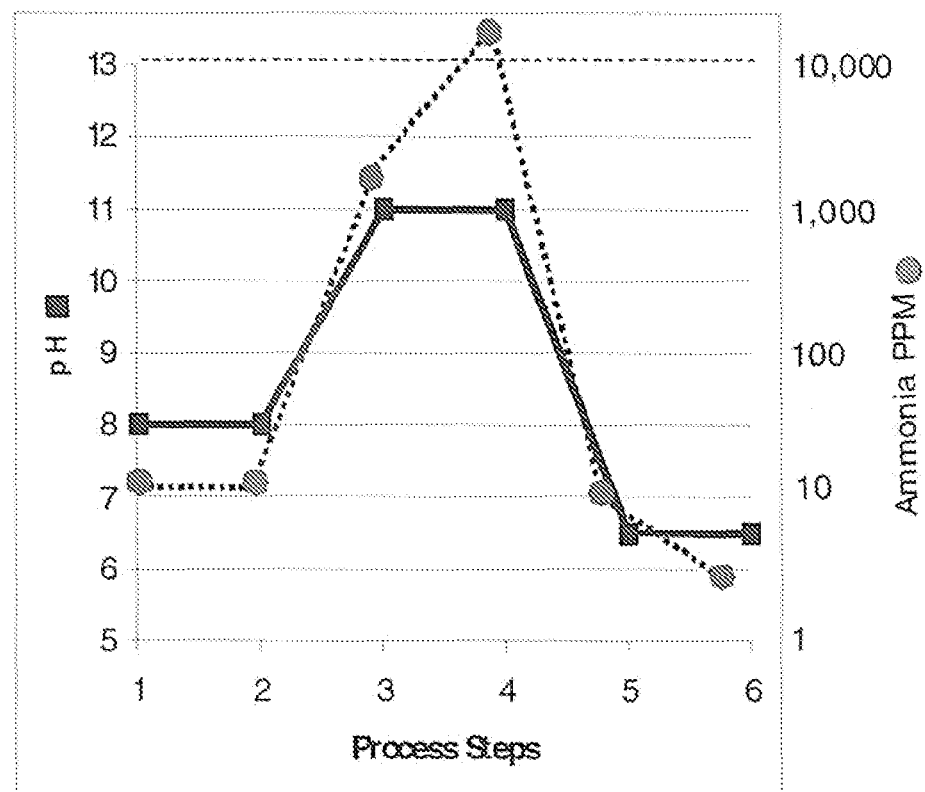
FIG. 1 Diagram of pH during process steps of "Alkaline Ammonia Pulse" Process.

As embodied and broadly described herein, the present invention is directed to systems, devices and methods for treating organic containing sludges and producing an inorganically-enhanced bioorganic fertilizer.

The "inorganically-enhanced bioorganic fertilizer" is produced in a method of processing organic containing sludges to a microbially safe condition simultaneously with combining such sludges with plant nutrients containing nitrogen, phosphate, potassium along with sulfur and iron.

It has been surprisingly discovered that by chemically modifying organic containing sludges to fit the needs of nitrogen, phosphorus and/or potassium fertilizer requirements by reacting them with hot, molten or oxidative compounds of nitrogen, phosphate and other plant nutrients like potassium, sulfur, iron, and/or calcium creates a unique and valuable product. The results are a product with at least: a) enhanced commercial valuation, b) reduced odor; and, c) increased nitrogen, phosphorus, iron or other plant nutrients, e.g., potassium and/or sulfur. Significantly, the treated finished product, because it contains a high level of nutrient and is made to contain the physical characteristics of commercial fertilizers, can be sold as is into the commercial marketplace, in other words, without further modification or supplementation as is required with other materials. The advantages associated with the present invention over the state of the art include one or more of the following: combination of high concentration of inorganic plant nutrients with an unusually high concentration of organics in the same fertilizer granule, binding of the organics with the inorganic ammonium ions, production of a safer biosolids or organic sludge containing product, reduction of odors of the dried fertilizer product, increased nitrogen content in the product, increased phosphorus content in the product, increased iron content in the product, increased sulfur content in the product and/or increased potassium content in the product and/or increasing the calcium content or other mineral content in the product.

The conventional method for treating municipal wastewater sludge is to make products that are safe from a public health standpoint, preferably achieving the U.S. EPA's Class A standard for biosolids containing products. The problem is that these products generally have such low commercial value that they have difficulty moving consistently into the commercial marketplace especially at distances over 200 miles from the site of manufacture. As a consequence of this, these biosolids products are either sold for a few dollars per ton or given away or even commonly buried to simply dispose of them. The present invention integrates plant nutrients into the finished product which increases the value of the finished fertilizer and may, as a secondary effect, reduce said odors associated with the finished product.

By using aqueous ammonia instead of anhydrous ammonia as a disinfectant and simultaneously as a source of nitrogen, the manufacturing process avoids the restrictions and prohibitions that exist in many communities from transporting or working with the potentially hazardous anhydrous ammonia material.

Preferably, the process of the invention may be established close to or at existing or new wastewater treatment plants if processing municipal biosolids. If processing a manure or animal waste or biological sludge as in from a fermentation process, it is preferable that the processing plant be constructed as near to the source as possible. Logistics and liability can be minimized by the close association of the inorganically augmented bioorganic fertilizer plant with the biosolids or organic containing sludge source.

The present invention teaches improving the odorant quality of the biosolids that are fed to a granulation and heat drying step and improving the odorant quality of the finished fertilizer by introducing chemical additives to react with odorants within the biosolids, and by placing a coating on the granules or pellets produced thereby reducing the rate at which remaining odorants emit from the finished pellet product. Such a coating also reduces the dusting of said pellets during storage, transport and application thereby further improving their value and usefulness.

The present invention introduces significant chemical stresses to microorganisms that are contained in the dewatered biosolids during the manufacturing process. For example, the treatment of the slightly alkaline biosolids, normally found between pH 7.0 and pH 9.0 to a treatment pH of greater than pH 10 and preferably greater than pH 11 causes the ammonium ions present in the mix to convert to gaseous ammonia. This free ammonia begins the disinfection process for the mix. Further, the present invention teaches that either aqueous ammonia, or anhydrous ammonia, can be directly added to the mix to further increase the concentration of free ammonia and continue the disinfection process. The concentration of free ammonia should meet or exceed 2,000 ppm, or 5,000 ppm, and preferably 10,000 ppm and more preferably 15000 ppm. Such concentrations of ammonia are strongly antimicrobial and directly sensitize very retractile microorganisms such as microbial spores, cysts, and parasite eggs to additional stresses such as acid pH exposure and or heat exposure. High concentrations of ammonia will affect the membranes of microorganisms. The present invention does not need the ammonia to kill the microbial pathogens present, but only needs to sensitize them making exposure to subsequent acidification, and or heat, more effective in destroying these organisms. The concentration of ammonia added to the mix can be raise the concentration of nitrogen in the mix by 6%, preferably by 10% and more preferably by 14%. A portion of this ammonia can be added after the acidification step to avoid creating too much gaseous nitrogen. Adding a portion of the ammonia after acidification will facilitate the production of ammonia salts such as ammonium sulfate or ammonium phosphate. Some additional acid may need to be added after this second ammonia addition in order to react with any free ammonia and to adjust the pH to between pH 5.0 and 7.0.

The present invention improves and broaden the art of municipal sludge treatment and fertilizer manufacture by making a safe valuable inorganically augmented organic combined fertilizer.

Figure 2:
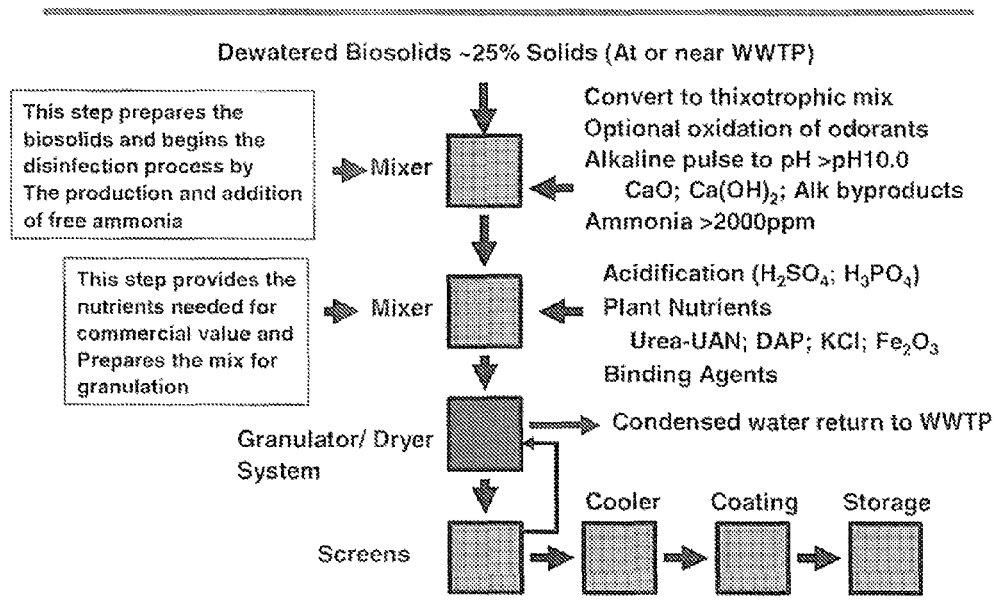
FIG. 2 Schematic Diagram of "Alkaline Ammonia Pulse" Process.

The graph in FIG. 1 and the diagram in FIG. 2 illustrate the steps and associated pH changes that occur during the treatment of a biological sludge or biosolids with the present invention. Step 1 represents the starting pH of the untreated dewatered biological sludge or biosolids. Further, the starting ammonia concentration in the untreated sludge was about 15 ppm. Step 2 is the conditioning step in which the biosolids or sludge is rendered thixotrophic or into a paste-like consistency. The pH and the ammonia concentration did not change. In step 3, an alkaline material selected from calcium oxide, calcium hydroxide, potassium hydroxide, sodium hydroxide, alkaline by products such as cement kiln dust, lime kiln dust, Class C fly ash, Class F fly ash, lime injected fly ash or other high alkaline materials, is added and mixed directly to the biological sludge. This causes the pH to rise, as in this example to pH 11.0. This pH rise causes ammonium ion present in the biological sludge to convert to gaseous ammonia and begin the disinfection process.

As a consequence, the free ammonia concentration rose to 2000 ppm. In step 4 additional 9% waste aqueous ammonia is added. This ammonia may also be anhydrous or may be other aqueous percents such as the commonly used 29% aqueous ammonia used in commercial fertilizer protocols. As a consequence, the free ammonia rose to over 10,000 ppm. At the concentrations in step 4 and step 5, ammonia is diffusing into the microorganisms present, causing damage to the cells and cell membranes, and decreasing their subsequent resistance to additional stresses such as acidification and or the application of heat during additional mixing steps or during granulation and drying. The ammonia exposure in the mix should be for a period of about 30 seconds, preferably for about 2 minutes and more preferably for over 5 minutes. During the period of ammonia exposure that the mix be agitated to maximize exposure of microorganisms contained in the sludge to the ammonia. In step 5, an acidification takes place, in this example using waste black phosphoric acid at 65% $P_2O_5$. This step reduces the pH to the physiological friendly pH ranging from pH 5.7 to pH 7.0, preferably to pH 6.5. The reaction of this acid with the ammonia present in the mix creates ammonium phosphate and will release exothermic heat into the mix. This heat, greater than 176 degrees Fahrenheit (80° C.), preferably greater than 212 degrees Fahrenheit (100° C.) and more preferably greater than 250 degrees Fahrenheit (121° C.), following the ammonification earlier, will continue the disinfection process. This acidification step will reduce the ammonia: concentration significantly—in this example, to 10 ppm. Further, the ammonium phosphate now formed in the reacted mix will contribute plant nutrient value to the final product. In the final Step in this example, other nutrients are added, selected from the group comprised of ammonium sulfate, ammonium nitrate, mono-ammonium phosphate, di-ammonium phosphate, potash, urea, ferric oxide, and ferric sulfate and the mix is processed using conventional granulation and drying technologies into the finished hard, dry granular fertilizer product. Further, liquid fertilizers, such as urea ammonium nitrate ("UAN"), and or aqueous urea, can be blended into the mix following acidification. The concentration of free ammonia will continue to drop—in this example, to approximately 3 ppm.

FIG. 2 of the Alkaline, Ammonification Pulse ("AAP,") process shows the steps used to create a valuable fertilizer product starting with an organic sludge. The pH and the ammonia concentration are represented as steps. Step 1 represents the biosolids as they enter the process. Step 2 is immediately after the biosolids are rendered thixotrophic. Step 3 is upon addition of the alkaline material to the process initially increasing the ammonia concentration. Step 4 adds additional ammonia required to raise the ammonia concentration in the mix to over 10,000 ppm. Step 5 is following acidification of the mix. Step 6 is the resultant pH and ammonia concentration at completion of the process of the invention.

Overall, the dewatered municipal biosolids at a concentration of approximately 25 percent solids. In the AAP process, the preferred practice is to place the processing plant at or near the biosolids generating plant, preferably the wastewater treatment plant ("WWTP"). One purpose of the close proximity of the AAP processing plant with the WWTP is to reduce logistics and liability associated with moving the sludge or biosolids from the WWTP to the AAP plant as well as to retain the processing capability of returning extracted water from the biosolids back to the WWTP thereby preventing the necessity of discharging this water into the aqueous or atmospheric environment. By not having to transport the amount of water contained in dewatered biosolids to a distant biosolids processing plant a large economic savings can be an advantage.

The initial step in the AAP process as shown in FIG. 1 is to convert the dewatered biosolids cake into a thixotrophic material, preferably a paste-like consistency without the addition of water or other materials to the biosolids or sludge. This is accomplished efficiently using the preferred method of introducing the biosolids into a plow blender dual-shafted pugmill or other vigorous mixer, which will agitate and mix the biosolids into the thixotrophic consistency. Following this step, the biosolids can be deodorized if necessary, by the introduction into the pugmill or mixer or an additional pugmill or mixer of an oxidant, in this example, a chlorine dioxide, which oxidatively modifies the reduced sulfur, amine and organic odors to an acceptable level. Alternatively, the addition of calcium ferrate or potassium ferrate can be added as the oxidative step. The addition of ferrate has the advantage here since ferrate is a powerful oxidant that has the ability not only to oxidize reduced sulfur compounds and other odorants, it can denature protein and other organic molecules present in the sludge thereby reducing or eliminating their odor or biological activity. Further, the addition of ferrate, following the oxidation, causes valuable iron to be part of the nutrient chemistry of the final product. The next step in the procedure, for which this method obtains its title, is the addition of an alkaline agent, in this example, the addition of an amount of lime kiln dust containing calcium oxide, which raises the pH of the mix to greater than pH 10.0 and in this example to pH 11.0. This increase in pH will cause the liberation of a significant proportion of the ammonium ion present into free ammonia. This free ammonia will commence the disinfection process for the biosolids. To insure that disinfection is significant and that sufficient nitrogen is added to the mix to form a valuable fertilizer, the next step is an ammonification of the mix by the introduction of an ammonia containing material, in this example, using 9% aqueous ammonia, to raise the ammonia concentration in the mix to greater than 10,000 ppm and in this example to 15,000 ppm. This concentration of ammonia will cause membrane damage to the microorganisms present and continue the disinfection process. Many microorganisms will die as a result of this treatment; however, it is not necessary for all of the pathogens present to be killed by this step. What does happen is that this ammonification is a significant stress to the pathogens present and renders them more sensitive to subsequent antimicrobial stresses of acidification and ultimately in the process of this invention to heat exposure, greater than 176 degrees Fahrenheit (80 degrees Celsius), preferably above 212 degrees Fahrenheit (100 degrees Celsius) and more preferably above 250 degrees Fahrenheit (121 degrees Celsius), such that the resultant product is safe from a public health perspective. The product of this invention meets the U.S. EPA's Class A standard for products containing a percentage of municipal biosolids.

The ammonification step occurring in a pugmill or mixer is then followed in a subsequent pugmill, by the acidification of the mix. Preferably, and in this example, phosphoric acid is added, in this case 65% waste black phosphoric acid, such that the pH in the mix is reduced to below pH 7.0 and in this example to pH 6.5. Various plant nutrients are then added, such as diammonium phosphate ("DAP"), ammonium sulfate, urea, potash ("KCl"), and or ferric oxide to create a plant nutrient concentration that is suitable for marketing the product as a commercial fertilizer. In this example, the nutrients added caused the mix, in the final product, to equal, on a weight percent basis a 10-10-10-0-1-20 (N-P-K-S-Fe-Organic) fertilizer. Further, granulating agents, such as industrial molasses or proprietary binding agents, are added here to facilitate the granulating process to convert the mix into spherical granules. The mix is then moved to a granulator dryer to create a product with a preferred diameter of between 2.0 mm and 3.5 mm, preferably and in this example to 2.7 mm. The proper diameter is insured by moving the granules through a screen system with the reject sizes being milled and recycled to the granulation system. The proper sized granules are cooled, and optionally coated with a material to prevent the dusting of the granules during storage and shipment. Further, the optional coating material is selected, in the Present invention, to retard the emission of any odorants remaining in the granules. Finally the granules are moved to dry storage until shipment. Preferably, the granules have a dryness of 90% or more solids.

The present invention accomplishes at least the following:
A. The creation of a high value fertilizer granule employing an alkaline and ammonia stabilization strategy.
B. That sludges or biosolids to be treated may be comprised of municipal biosolids or sludges, manures or animal residuals, or from organic sludges as produced from food fermentation wastes or pharmaceutical fermentation wastes.
C. The production of a commercially viable amount of plant nutrient content in finished fertilizer granules.
D. Methods to reduce the odors associated with organic containing sludges during the production of inorganic augmented-bioorganic fertilizer granules.
E. The first step in treating organic containing sludges is to convert them to a thixotrophic or paste-like mix.
F. Following conversion to a thixotrophic paste the addition of an alkaline agent to the mix will cause the ammonium ion present to convert to free ammonia.
G. An additional pulse of ammonia can be added to bring the free ammonia concentration to over 1000 PPM and preferably over 10,000 PPM and more preferably over 20,000 PPM.
H. Nutrient enhancement may come from directly adding dry or liquid fertilizers to the mix before it is granulated and dried.
I. The reduction of odors and addition of plant nutrients to said fertilizer granules.
J. Reduction of odors and addition of plant nutrients to occur simultaneously in the production of said fertilizer granules.
K. The introduction of a multiple sequential antimicrobial stresses during the manufacture of fertilizer granules.
L. Concentrated acid is added to ammoniated dewatered biosolids a significant exothermic heat reaction will occur which will introduce a physical heat disinfecting process to the biosolids prior to the granulating and drying steps in the manufacture of fertilizer granules.
M. The production or manufacture of a valuable fertilizer capable of being sold into the commercial agricultural marketplace.
N. Treats biosolids or organic containing sludges to increase the level of plant nutrients that will be contained and plant available in the finished dried pellet or granule. The chemical additions are made to dewatered biosolids. The chemical additions are added to the dewatered biosolids by means of a mixer, such as a pugmill, preferably a dual-shafted plow-bladed pugmill, that blends the additives with the biosolids mix such that the additives have the opportunity to completely interact and react with the chemical components of the biosolids.

In one embodiment of the invention, an alkaline material is added to the organic sludge after the sludge is converted into a thixotrophic paste like material and after the sludge has been oxidized with an oxidizing agent such as calcium ferrate. This alkaline step is followed by an addition of more ammonia via either aqueous ammonia or anhydrous ammonia. Concentrated acid or mixture of concentrated acids, such as phosphoric acid and/or sulfuric acid is/are introduced to the ammoniated mix. Further, the acid pH created by such acid addition is within the range of pH 4.0 to 7.5, preferably from pH 5.0 to 7.0 and preferably to a narrower range of pH 5.8 to pH 6.8. Such a desirable pH range is preferred by fertilizer distributors and/or the grower/farmer final customer of the product of this invention. The effect of this interaction and reaction is to lessen the odor associated with the finished heat dried product and to increase the plant nutrient chemical content and value of the finished heat dried product. Concentrated phosphoric acid, as 70% super phosphoric acid and/or 50-65% phosphoric acid (black or green, agricultural grade phosphoric acid) is added directly to the ammoniated sludge mixture. The addition of phosphoric acid not only reduces the odor associated with such biosolids, but simultaneously increases the phosphorus (P) content of the finished product. The generation of ammonia by addition of alkaline admixture to the biosolids as well as by direct additions of ammonia, either as aqueous ammonia or anhydrous ammonia or ammonium ions, will have a disinfecting role in destroying pathogens that are contained in the dewatered biosolids prior to the drying step of fertilizer granule manufacturing process.

Further, the present invention involves oxidants such as such as calcium ferrate or potassium ferrate or sodium ferrate, hydrogen peroxide, oxygen, ozone, sodium hypochlorite and calcium hypochlorite and chlorine dioxide in reducing odor of organic containing sludges prior to their being treated with the alkaline agent and the ammoniating agent. Further, the invention teaches the use of iron oxide and other forms of iron, such as iron sulfate which can be mixed in directly with the alkaline mix.

Further, the process employs one or more nutrient fertilizer materials, such as ammonium sulfate, ammonium nitrate, mono-ammonium phosphate, di-ammonium phosphate, and urea and further, may be selected from the group of liquid fertilizers, such as urea ammonium nitrate ("UAN"), liquid urea or from other liquid N-P-K fertilizers such as, for example, 16-4-8, 10-8-8, or 6-14-6.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only.

The invention claimed is:

1. A method of fertilizer manufacture comprising:
    creating a thixotropic paste from a composition containing biosolids;
    exposing the paste to aqueous ammonia;
    adding an acid to the paste to produce an exothermic reaction and thereby reduce pH and ammonia concentration;
    extruding or granulating the paste; and
    drying the extruded or granulated paste to a dryness of 90% or more of solids.

2. The method of claim 1, wherein the biosolids are selected from the group consisting of municipal biosolids and sludges, manures and animal residuals, lagoon sludges, organic-containing sludges produced from food fermentation, sludge waste products, pharmaceutical fermentation waste industrial fermentation products, and mixture and combinations thereof.

3. The method of claim 1, further comprising adding an oxidizing agent to the paste, wherein the oxidizing agent is selected from the group consisting of hypochlorite, sodium hypochlorite, calcium hypochlorite, iron oxide, metal oxide, calcium ferrate, potassium ferrate, sodium ferrate, oxygen, hydrogen peroxide, peroxide, ozone, chlorine dioxide, and combinations thereof.

4. The method of claim 1, further comprising adding an alkaline agent to the paste, wherein the alkaline agent is selected from the group consisting of calcium oxide, calcium hydroxide, potassium hydroxide, sodium hydroxide, alkaline by products, cement kiln dust, lime kiln dust, Class C fly ash, Class F fly ash, lime injected fly ash, high alkaline materials, and combinations thereof.

5. The method of claim 4, wherein, after addition of the alkaline agent, the paste is pH 10 or higher.

6. The method of claim 1, wherein the aqueous ammonia raises the concentration of ammonia to at least 5,000 ppm.

7. The method of claim 1, wherein the aqueous ammonia raises the concentration of ammonia to at least 10,000 ppm.

8. The method of claim 1, wherein the aqueous ammonia raises the concentration of ammonia to at least 20,000 ppm.

9. The method of claim 1, wherein the exposure is for at least 30 seconds.

10. The method of claim 1, wherein the exposure is for at least 2 minutes.

11. The method of claim 1, wherein the exposure is for at least 5 minutes.

12. The method of claim 1, wherein the ammonia provides a dry weight nitrogen concentration of 6%.

13. The method of claim 1, wherein the ammonia provides a dry weight nitrogen concentration of at least 10%.

14. The method of claim 1, wherein the ammonia provides a dry weight nitrogen concentration of at least 14%.

15. The method of claim 1, wherein the acid is phosphoric or sulfuric acid.

16. The method of claim 1, wherein the acid is selected from the group consisting of phosphoric acid, sulfuric acid, sulfamic acid, hydrochloric acid, nitric acid and combinations thereof.

17. The method of claim 1, wherein, after treating with the acid, the paste is pH 7.0 or less.

18. The method of claim 1, further comprising blending a plant nutrient with the thixotropic paste to increase one or more members selected from the group consisting of nitrogen, phosphorus and iron content of the paste.

19. The method of claim 1, further comprising adding a granulating agent to the paste.

20. The method of claim 1, wherein the aqueous ammonia raises the concentration of ammonia to at least 1,000 ppm.

21. The method of claim 3, wherein at least one member selected from the group consisting of the acid and the oxidizing agent reduces odors in the paste.

* * * * *